United States Patent Office 3,099,635
Patented July 30, 1963

3,099,635
AMINOPLAST-PIGMENT COMPOSITION AND
ITS APPLICATION TO TEXTILES
Kuno Wagner, Leverkusen-Bayerwerk, Richard Schwaebel, Leverkusen, Wilhelm Käss, Cologne-Stammheim, Wilhelm Graülich, Leverkusen-Bayerwerk, and Helmut Kleiner, Cologne-Stammheim, Germany, assignors to Farbenfabriken Bayer Aktiengesellschaft, Leverkusen, Germany, a corporation of Germany
No Drawing. Filed Nov. 27, 1957, Ser. No. 699,181
Claims priority, application Germany Dec. 1, 1956
9 Claims. (Cl. 260—29.4)

The present invention relates to a process for dyeing and printing of textiles and to compositions for dyeing and printing of textiles.

For the fixation of pigments on fabrics which are fast to washing it is known to use higher molecular weight compounds as binding agents. Recently synthetic materials have been used preponderantly as binding agents, employed either in the form of a solution or an emulsion. When using emulsions of water-insoluble binders (polymeric film-formers), prints or dyeings are obtained the fastness to washing and rubbing of which is frequently insufficient to meet higher requirements, especially when applied to staple fibre. The fixation of pigments with water-soluble condensation products such as urea-formaldehyde condensates, does not lead to satisfactory fastness properties. When water-insoluble film-formers are combined with water-soluble urea-formaldehyde resins in the pigment printing, the fastness to washing is actually improved, and in particular a better adhesion of the binders on staple fibres is obtained, but the general fastness properties such as fastness to drying, wet-rubbing and to solvents are not altogether satisfactory. Finally, the use of such methylol compounds or their soluble condensation products often leads to a harsh handle of the fabric since the insoluble condensation products of the final stage give a harsh handle.

In accordance with the invention it has now been found that pigment prints or pigment dyeings having an outstanding adhesion and excellent fastness to washing, to light exposure and rubbing are obtainable by using as binding agents the emulsions of water-insoluble to slightly soluble polymeric film formers in combination with poly-condensation products containing methylol groups which are obtained by a preferably basically catalyzed condensation of high molecular weight N-methylol polyethers containing methylol groups, with preferably low molecular weight poly-N-methylol compounds, the N-methylol-polyethers with plasticizing properties being preponderantly modified via their methylol groups to form soluble condensation products containing methylene ether bridges (—CH$_2$—O—CH$_2$—).

Modified N-methylol-polyethers which are especially useful for the process according to the invention, are obtained by reacting in the aforesaid manner highly branched N-methylol-polyethers, for example N-methylol-polyethers from poly-N-methylol compounds and trifunctional or higher functional alcohols, with preferably low molecular weight poly-N-methylol compounds. Suitable high molecular weight condensation products, used for the reaction with the poly-N-methylol compounds, are, for example, those from trimethylol urea, or mixtures of trimethylol urea and dimethylol urea, and hexanetriol, butanetriol, hexanetriol-glycerol or mixtures of said polyhydric alcohols with oxethylated polyhydric alcohols.

The production of some of the high molecular weight N-methylol-polyethers from polyhydric alcohols containing ether and thioether groups, and poly-N-methylol compounds, is described in copending application Ser. No. 680,407, filed by Kuno Wagner and Erwin Müller on August 26, 1957, now U.S. Patent No. 2,976,261, which application is assigned to the same assignee.

Other high molecular weight N-methylol-polyethers applicable for the modification reaction can be produced from poly-N-methylol compounds and any other polyhydric alcohols for example by condensing dimethylol compounds of urea in the presence of formaldehyde, or tri- and tetramethylol compounds of urea, the polyhydric alcohols in the presence of very small quantities of acid.

The modification of high molecular weight N-methylol-polyethers containing methylol groups with poly-N-methylol compounds in the presence of basic compounds to form the highly valuable cross-linking agents to be used according to the invention is the object of the copending application Ser. No. 698,939 (filed November 26, 1957, filed by Kuno Wagner and which application is assigned to the same assignee). Very suitable for this purpose are the N-methylol-polyethers based on urea or thiourea, which are modified by condensation, in the presence of basic compounds, of higher molecular weight N-methylol-polyethers containing methylol groups with poly-N-methylol compounds of for example hexamethylol compounds or melamine, the poly-N-methylol compounds of melamine, acetylene urea, poly-N-methylol compounds of adipic acid dihydrazide, hydrazodicarboxylic acid-amide, dicyanamide, polymethylol compounds of diurethanes and diamides. There may also be used for the modification of the N-methylol-polyethers such low molecular weight poly-N-methylol compounds which are also present in the basic molecule of the high molecular weight N-methylol-polyethers; thus, high molecular weight N-methylol-polyethers based on tetramethylol adipic acid-diamide can be modified with tetramethylol adipic acid-diamide.

The following monomers are suitable for the production of the water-insoluble or slightly soluble polymeric film-formers to be used: acrylic acid esters, methacrylic acid esters, acrylonitrile, styrene, vinyl chloride, vinylidene chloride, vinyl esters and vinyl ethers and the like, further, divinyl compounds such as butadiene, isoprene and their derivatives. Useful compounds are also co-polymers which contain, for example, polymerized acrylic acid amide and methacrylic acid amide, acrylic acid and methacrylic acid, maleic acid, crotonic acid, glycerol-mono-acrylic ester, glycol-monoacrylic ester, acrylic acid-hydroxy-alkyl amides, acrylic acid amino-alkyl esters, since their functional groups are capable of reacting with the methylol groups of the modified N-methylol-polyethers. For the fixation of pigment prints which are fast to solvents, particularly to chlorinated hydrocarbons, those polymers or co-polymers are suitable which contain several times in the molecule the grouping:

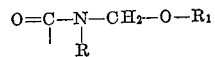

wherein R means a hydrogen atom, an alkyl or aryl radical and R$_1$ means an alkyl group. Polymers or co-polymers from compounds containing methylol ether groups, for example alkyl ethers of the methylol compound of acryl amide, methacryl amide, sorbic acid amide or muconic acid diamides, or of methylol compounds of unsaturated urethanes and unsaturated ureas, e.g. methacrylic acid-amide methylol-methyl ether, are obtainable according to the process of Belgian Patent 539,963.

Dependent on the handle desired for the fabric to be treated, the type and quantity of the individual components are selected. By using, for example, large quantities of butadiene or acrylic acid esters having more than 3 carbon atoms in the alcohol radical, binding agents are obtained which impart to the treated fabric a soft handle. Acrylonitrile-containing co-polymerisates give films which are fast to solvents.

The process according to the invention can also be combined with a treatment of the fabrics with finishing agents such as starch, polyvinyl alcohol, dextrin or other high molecular weight natural or synthetic compounds. Finally, it is also possible to add to the printing pastes the customary hydrophobing agents or plasticizers, advantageously those which are capable of reacting with the reactive groups of the N-methylol-polyethers and modified N-methylol-polyethers or polymeric film-formers, for example the methylol compounds of the stearic acid amide and the like. In addition there may also be added high molecular weight compounds containing amino or imino groups in the form of water-soluble salts or emulsions.

Inorganic and organic pigments employed for coloring or delustering can be used for the process according to the invention. Suitable pigments are for example, phthalocyanine dyestuffs, azo dyestuff pigments, vat dyestuff pigments, metal oxides or carbon black. In addition, any desired fillers, such as silicic acids and the like, may be added to the mass.

Customary thickening agents are added to the printing pastes, for example water-soluble thickeners such as tragacanth, starch, cellulose ether, sodium alginate, polyvinyl alcohol, polyacrylic amide or the ammonium salt of polyacrylic acid. Emulsions of the type "oil-in-water" can also be used. The preparation of printing compositions may be effected in any sequence.

In order to attain the complete condensation of the modified N-methylol-polyethers on the textile goods, it is advantageous to add to the printing or dyeing mixtures inorganic or organic acids or acid-splitting agents such as, for example, ammonium chloride or ammonium thiocyanate.

Temperatures between 100–160° C. are generally used as condensation temperatures; temperatures of approximately 130° C., and condensation times of between 3–10 minutes are preferably used.

The use of high molecular weight modified N-methylol-polyethers containing methylol groups involves in pigment printing or pigment dyeing a better adherence of the binder film to the textile materials as compared with the known low molecular weight methylol compounds, for example, those of urea, thiourea, aminotriazine and other low molecular weight methylol compounds or their water-soluble preliminary condensation products, so that dyed or printed materials are obtained having a soft handle and excellent general fastness properties. The prints are fast to the influence of light and alkalies. Brilliant prints of sharp distinct outlines are obtained which are resistant to light exposure and fast to rubbing washing and solvents.

The following examples are given for the purpose of illustrating the invention without, however, limiting it thereto.

Example 1

Cotton is printed in conventional manner with a printing paste having the following composition:

5.8 grams of a 30 percent aqueous dispersion of a copper-phthalocyanine dyestuff,
24.7 grams of a 40 percent aqueous co-polymer consisting of butadiene, acrylic acid butyl ester, styrene, acrylonitrile, methacrylic acid and methacrylamide (30:30:30:6:2),
49.4 grams of a thickener consisting of 70% of a hydrocarbon having a boiling range of 180–200° C., 28% of water and 2.0% of a suitable commercial emulsifier,
9.7 grams of a methyl cellulose in a 7 percent aqueous solution, and
  (a) 6.8 grams of a trimethylol urea-butanetriol (1,2,4)-polyether modified with hexamethylol-melamine by basically catalyzed condensation, in a 71.4 percent aqueous solution of water-hexanetriol (1:1), or
  (b) 6.8 grams of a N-methylol-polyether obtained from tetramethylol urea, glycerol and triethylene glycol and modified with hexamethylol-melamine, in 71.4 percent solution of water-hexanetriol (1:1), or
  (c) 6.8 grams of a N-methylol-polyether obtained from trimethylol urea, hexane-triol and butane-dihydroxyethylglycol and modified with tetramethylol-dimethylacetylene urea, in a 71.4 percent solution of water-hexanetriol (1:1).
1.8 grams of ammonium chloride in a 25 percent aqueous solution, and
1.8 millilitres of water.

After printing, the material is dried and after-treated (fixed) at temperatures between 100 to 150° C. The prints thus obtained distinguish themselves even when exposed to light for a prolonged period of time by an outstanding resistance to light exposure and have excellent fastness properties.

Example 2

Cellulose is printed in conventional manner with a printing paste of the following composition:

11.8 grams of a water-insoluble azo dyestuff in a 30 percent aqueous dispersion are mixed as with
29.7 grams of a synthetic latex as described in Example 1; into this mixture there are introduced
47.7 grams of a 37 percent aqueous methyl cellulose solution,
8.4 grams of a trimethylol urea-hexanetriol-polyether modified by basically catalyzed condensation with hexamethylol-melamine, in a 71.4 percent solution of water-hexanetriol (1:1) and
2.4 grams of di-ammonium phosphate in a 25 percent aqueous solution.

The fixation can be carried out by drying at about 80° C., by neutral or acid steaming, or by heating the fabric to elevated temperatures. Brilliant prints are obtained of sharp outlines which are resistant to light exposure and fast to rubbing, washing and to solvents.

Example 3

19.2 grams of a 30 percent aqueous emulsion of carbon black are mixed with
24.0 grams of a 40 percent aqueous latex consisting of a co-polymer of 70.0 grams of acrylic acid butyl ester, 26.0 grams of acrylonitrile, 4.0 grams of methacrylic acid. This mixture is stirred into
48.3 grams of a benzene thickening as described in Example 1, containing 20 percent of a 6.5 percent aqueous tragacanth solution;
6.7 grams of a 71.4 percent solution of a tetramethylol urea-glycerol-diethyleneglycol polyether modified by basically catalyzed condensation with hexamethylol-melamine are added to the mixture. It is advantageous to use as a catalyst
1.8 grams of ammonium salts of phosphoric acid, hydrochloric acid, nitric acid or thiocyanic acid in 25 percent solution.

The cotton fabric is coated with this printing paste. The fixation may be carried out similarly to the process described in Example 2. The cotton prints thus obtained have a soft handle, are resistant to light exposure and fast to washing, rubbing and to solvents; they do not turn yellow by the action of alkalies or when exposed to light for a prolonged period of time.

Example 4

6.4 grams of a chlorinated copper phthalocyanine dyestuff in a 30 percent aqueous suspension are treated with
19.0 grams of a 40 percent aqueous latex consisting of butyl acrylate and asymmetric dichloroethane (60:40). To this mixture there are added
63.2 grams of a 70 percent benzine emulsion in water and 8.9 grams of a 71.4 percent solution of trimethylol urea-hexanetriol-butanedihydroxyethylglycol-polyether modified by basically catalyzed condensation with hexamethylol-melamine. Subsequently 2.5 grams of di-ammonium phosphate in 25 percent solution are added.

The prints obtained on cotton show an extremely soft handle and, nevertheless, sharp outlines. The fastness properties are similar to those of the prints obtained in Examples 1 to 3.

The printing composition of this example can be used with special advantage for printing of synthetic materials, such as polyamide, polyurethane and polyacrylonitrile fibres; the prints produced in this manner do not turn yellow under the action of alkalies or when exposed to light for a prolonged period of time.

*Example 5*

9.5 grams of an aqueous 30 percent dispersion of a water-insoluble yellow azo dyestuff are stirred into a mixture of 28.0 grams of an aqueous 40 percent emulsion of a co-polymer consisting of butadiene, styrene, acrylonitrile, and methacrylamide-methylol-methyl ether (40:20:36:4), 4.5 grams of a 10 percent aqueous polyacrylamide solution, 20.0 grams of a 14 percent aqueous co-polymer emulsion of acrylamide and methacrylamide-methylol-methyl ether (42:58), 8.5 grams of a 71.4 percent solution of a trimethylol-urea-hexanetriol-polyether modified by basically catalyzed condensation with hexamethylol-melamine, 2.0 grams of an ammonium chloride in 25 percent aqueous solution and 27.5 millilitres of water.

A fabric is coated with this printing paste.

After neutral or acid steaming, the prints, produced for example, on cotton or staple fibre, are distinguished by an outstanding fastness to solvents, especially to chlorinated hydrocarbons, and correspond in their other fastness properties to those of the prints described in Examples 1–4.

We claim:

1. A composition for the fixation of a pigment on a textile, said composition comprising a pigment and, as binding agent, an emulsion of water insoluble to slightly soluble film forming vinyl polymer together with a soluble polycondensation product containing methylol groups and obtained by basically catalyzed reaction of a high molecular weight N-methylolpolyether containing methylol groups and being selected from the group consisting of trimethylolurea-butanetriol-(1,2,4)-polyether, tetramethylolurea - glycerol - triethyleneglycol - polyether, trimethylolureahexanetriol - butanedihydroxyethylglycol-polyether, trimethylolurea-hexanetriol-polyether and tetramethylolurea - glycerol - diethyleneglycol - polyether, trimethylolurea - tri - (β - hydroxyethoxy - hydroxymethyl)-propane-polyether, trimethylolurea-glycerol-triethyleneglycol-hexanetriol-polyether and trimethylolurea-hexanetriol-pentaerythritol-polyether, with stoichiometric excess of a monomeric poly-N-methylol compound selected from the group consisting of hexamethylol melamine and tetramethylol - dimethyl - acetyleneurea, hexamethylol-adipic acid dihydrazide, tetramethylol-tetramethylenediurethane, polymethylol-dicyandiamide, polymethylol-hexamethylenediurea, tetramethylol-adipic acid-diamide and tetramethylolacetyleneurea.

2. Compositions according to claim 1, containing the modified N-methylol-polyethers together with film forming vinyl polymers selected from the group consisting of polymers and co-polymers which contain several times in the molecule the grouping

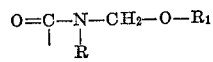

wherein R means a radical selected from the group consisting of a hydrogen atom, an alkyl and aryl radical and $R_1$ stands for an alkyl radical.

3. Compositions according to claim 2, containing film forming vinyl polymers selected from the group consisting of polymers and co-polymers of methacrylamid-methylol-methylether.

4. In a method of fixing a pigment on a textile the improvement which consists in applying to the textile a composition of claim 1.

5. Process according to claim 4, which comprises using the modified N-methylol-polyethers together with film forming vinyl polymers selected from the group consisting of polymers and co-polymers which contain several times in the molecule the grouping

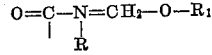

wherein R means a radical selected from the group consisting of a hydrogen atom, an alkyl and aryl radical and $R_1$ stands for an alkyl radical.

6. Process according to claim 5, which comprises using film forming vinyl polymers selected from the group consisting of polymers and co-polymers of methacrylamide-methylether.

7. Textile materials colored according to the process of claim 4.

8. In a method of pigment printing of a textile the improvement which consists in applying to the textile a composition of claim 1.

9. The process of claim 8 wherein the textile is cotton.

References Cited in the file of this patent

UNITED STATES PATENTS

| | | |
|---|---|---|
| 2,197,357 | Widmer | Apr. 16, 1940 |
| 2,385,320 | Greene | Sept. 18, 1945 |
| 2,485,187 | Cadot | Oct. 18, 1949 |
| 2,535,380 | Adams | Dec. 26, 1950 |